United States Patent [19]
Dvorkis et al.

[11] Patent Number: 5,621,371
[45] Date of Patent: *Apr. 15, 1997

[54] ARRANGEMENT FOR TWO-DIMENSIONAL OPTICAL SCANNING WITH SPRINGS OF DIFFERENT MODULI OF ELASTICITY

[75] Inventors: Paul Dvorkis, Stony Brook; Howard Shepard, Great Neck; Simon Bard, Stony Brook; Edward Barkan, Miller Place, all of N.Y.

[73] Assignee: Symbol Technologies, Inc., Holtsville, N.Y.

[*] Notice: The term of this patent shall not extend beyond the expiration date of Pat. No. 5,280,165.

[21] Appl. No.: 378,209

[22] Filed: Jan. 25, 1995

Related U.S. Application Data

[60] Continuation-in-part of Ser. No. 108,521, Jul. 19, 1993, abandoned, which is a division of Ser. No. 868,401, Apr. 14, 1992, Pat. No. 5,280,165, which is a division of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.⁶ .................................................. G06K 7/10
[52] U.S. Cl. ........................................ 235/462; 235/472
[58] Field of Search ................................. 235/454, 467, 235/470, 462, 472; 359/196, 212, 224, 201, 202

[56] References Cited

U.S. PATENT DOCUMENTS

| | | |
|---|---|---|
| 2,989,643 | 7/1952 | Scanlon . |
| 3,532,408 | 10/1970 | Dostal . |
| 3,981,566 | 9/1976 | Frank et al. ............................ 359/224 |
| 3,998,092 | 12/1976 | Maccabee ............................ 73/655 |
| 3,999,833 | 12/1976 | Reich et al. ............................ 359/214 |
| 4,021,096 | 5/1977 | Dragt ............................ 359/223 |
| 4,057,331 | 11/1977 | Ong et al. ............................ 359/224 |
| 4,123,146 | 10/1978 | Dragt ............................ 359/225 |
| 4,230,393 | 10/1980 | Burke, Jr. ............................ 359/220 |
| 4,302,709 | 11/1981 | Tichtinsky ............................ 318/116 |
| 4,502,752 | 3/1985 | Montagu ............................ 359/199 |
| 4,632,501 | 12/1986 | Glynn ............................ 359/199 |
| 4,732,440 | 3/1988 | Gadhok ............................ 359/214 |

(List continued on next page.)

FOREIGN PATENT DOCUMENTS

| | | |
|---|---|---|
| 0344882A2 | 12/1989 | European Pat. Off. . |
| 0471291A2 | 2/1992 | European Pat. Off. . |
| 2097148 | 10/1982 | United Kingdom . |
| 2175705 | 12/1986 | United Kingdom . |
| WO89/11113 | 11/1989 | WIPO . |

OTHER PUBLICATIONS

"A Precision Two–Coordinate One–Mirror Scanning Device" by V.L. Mamaev & B.S. Rosov translated from Pribory i Tekhnika Eksperimenta, No. 1, pp. 227–229 Jan.–Feb. 1976.

Abstract of Japanese Patent Appln. No. 60–107017, published Jun. 12, 1985, Masanori Tanabe, Hitachi Seisakusho K.K.

Abstract of Japanese Patent Appln. No. 63–34508, published Feb. 15, 1988, Munetaka Tamaru, Citizen Watch Co., Ltd.

*Primary Examiner*—Donald T. Hajec
*Assistant Examiner*—Karl D. Frech
*Attorney, Agent, or Firm*—Kirschstein, et al.

[57] ABSTRACT

A scanning arrangement for use in an optical scanner, for example a bar code scanner, comprises an optical element which is mounted for oscillation in two directions to produce a two dimensional scanning pattern. The optical element is preferably relatively light, and is mounted for oscillatory motion in an x direction by the flexing of a spring of relatively high modulus of elasticity. The spring is secured to a mounting bracket which itself is mounted to a stationary frame by a further spring which is arranged to flex and cause oscillation in the y direction. The mounting bracket is relatively heavy in comparison with the mirror, and the second spring has a relatively low modulus of elasticity, thereby producing a y oscillation which is slower than the x oscillation.

16 Claims, 5 Drawing Sheets

U.S. PATENT DOCUMENTS

| | | | |
|---|---|---|---|
| 4,878,721 | 11/1989 | Paulsen | 359/214 |
| 4,902,083 | 2/1990 | Wells | 359/214 |
| 4,919,500 | 4/1990 | Paulsen | 359/214 |
| 4,930,848 | 6/1990 | Knowles | 357/214 |
| 4,959,568 | 9/1990 | Stokes | 310/51 |
| 5,168,149 | 12/1992 | Dvorkis et al. | 235/472 |
| 5,245,463 | 9/1993 | Goto | 359/214 |
| 5,280,165 | 1/1994 | Dvorkis | 235/470 |

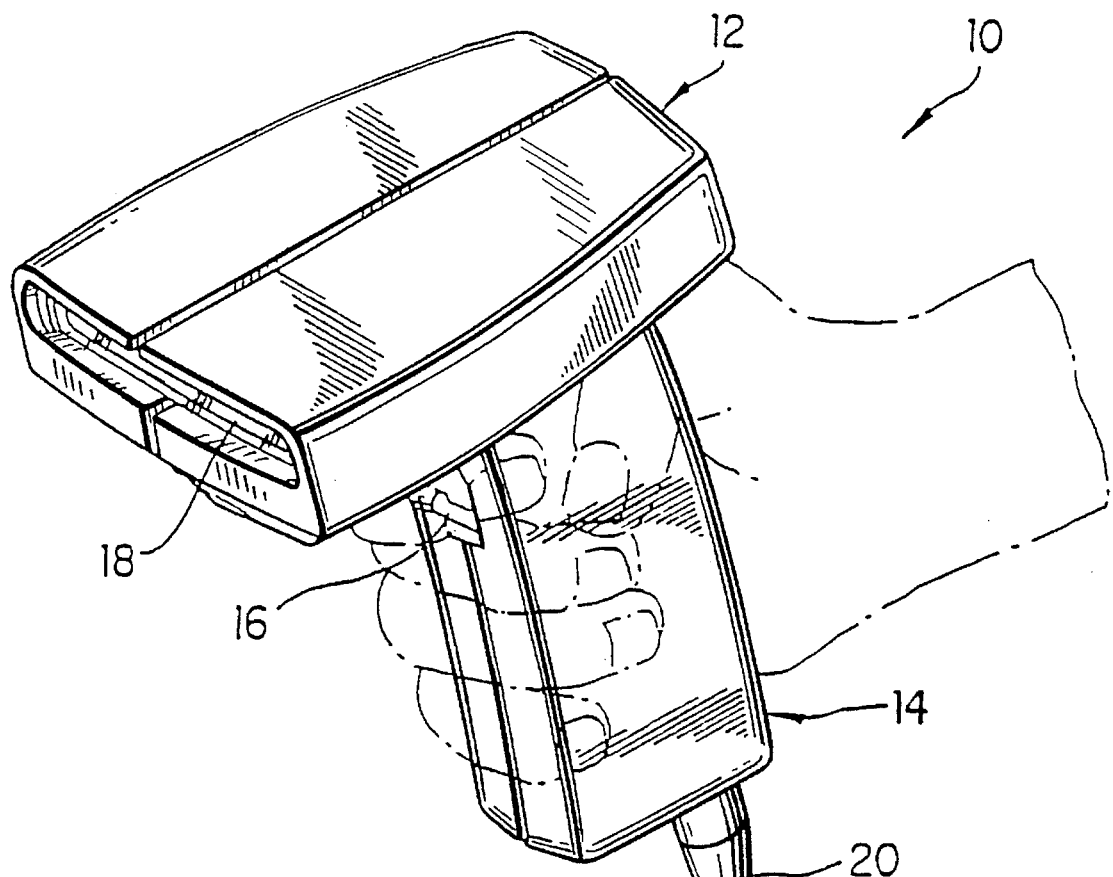
FIG. 1
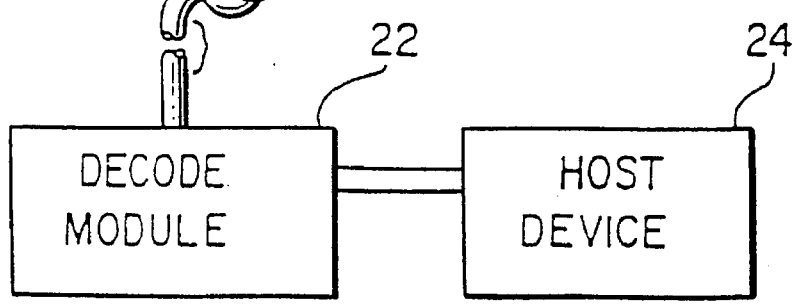

ARRANGEMENT FOR TWO-DIMENSIONAL OPTICAL SCANNING WITH SPRINGS OF DIFFERENT MODULI OF ELASTICITY

This application is a continuation in part of U.S. patent application Ser. No. 08/108,521 filed Jul. 19, 1993, now abandoned which is a division of U.S. Ser. No. 07/868,401 filed Apr. 14, 1992, now U.S. Pat. No. 5,280,165, which is a division of U.S. Ser. No. 07/520,464 filed May 8, 1990, now U.S. Pat. No. 5,168,149, which is a continuation-in-part of U.S. Ser. No. 07/428,770 filed Oct. 30, 1989, now U.S. Pat. No. 5,099,110. This application is also related to U.S. patent application Ser. No. 08/326,328 filed Oct. 20, 1994, entitled Compact Bar Code Scanning Module with Shock Protection.

BACKGROUND OF THE INVENTION

1. Field of the Invention

The invention generally relates to an optical scanning arrangement for use in an optical scanner, for example a bar code scanner.

2. Description of the Related Art

A typical optical scanner (for example a bar code scanner) has a light source, preferably a laser light source, and means for directing the laser beam onto a symbol (for example a bar code) to be read. On route to the symbol, the laser beam is generally directed onto, and reflected off, a light reflecting mirror of a scanning component. The scanning component causes oscillation of the mirror, so causing the laser beam repetitively to scan the symbol. Light reflected from the symbol is collected by the scanner and detected by a detector such as a photodiode. Decode circuitry and/or a microprocessor algorithm is provided to enable the reflected light to be decoded, thereby recovering the data which is recorded by the bar code symbol.

In the type of scanner known as a 2D scanner, the scanning component causes the light beam to trace out a two dimensional path across the symbol to be read. The preferred pattern depends upon the nature of the symbols with which the scanner is to be used, but typical examples include Lissajous figures and raster patterns.

Two dimensional scanning patterns are generally produced by mounting the mirror on the scanning component in such a way as to permit it to oscillate in two perpendicular directions. Conventionally, separate drive mechanisms were required to produce oscillation in the x direction and in the y direction, but more recently scanning components have been devised which can provide the required two dimensional motion using only a single magnetic coil. Examples are shown in U.S. Pat. Nos. 5,168,149 and 5,280,165, both of which are assigned to the assignee of the current invention, and both of which are hereby incorporated by reference.

SUMMARY OF THE INVENTION

Objects of the Invention

It is an object of the present invention to provide a reliable, inexpensive, arrangement for providing two dimensional scanning.

It is a further object to provide an arrangement in which the x direction scanning frequency may be very different from the y direction scanning frequency.

Features of the Invention

According to the present invention there is provided a scanning arrangement for use in a scanner for reading indicia having parts of differing light reflectivity, the arrangement comprising:

a) an optical element;

b) a mounting bracket, the optical element being mounted for oscillation to the mounting bracket by a first spring having a relatively high modulus of elasticity, the optical element having a relatively low inertia when oscillating by elastic movement of the first spring; and c) a stationary frame, the mounting bracket being mounted for oscillation to the frame by a second spring having a relatively low modulus of elasticity; the optical element, mounting bracket and first spring means taken together having a relatively high inertia when oscillating by elastic movement of the second spring means; and, preferably d) driving means arranged to oscillate the optical element with respect to the mounting bracket at a relatively high frequency, and the mounting bracket with respect to the frame at a relatively low frequency.

The inertia referred to will of course depend upon the mass of the optical element in one case, as well as the disposition of that mass with respect to the first (flexible) spring or spring means. In the second case, the inertia will depend upon the combined mass of the optical element, the mounting bracket and the first (flexible) spring means, along with the disposition of that mass with respect to the second (flexible) spring or spring means.

The respective oscillation frequencies will depend upon the moduli of elasticity of the first and second flexible spring. Where the flexible spring comprises a torsion spring, or a wire acting as a torsion spring, the particular modulus of interest will be the modulus of rigidity, defined as the ratio of the tangential force applied per unit area to the resulting angular deformation. In a preferred embodiment, however, the oscillation is provided by a flexing leaf spring. Preferably, the first spring comprises a leaf spring which is arranged to flex in one direction; the second spring comprising a second leaf spring being arranged to flex in a perpendicular second direction.

Preferably, both oscillation in the x direction and in the y direction is resonant.

The first spring may be connected to the second spring by any type of intermediate member, and not necessarily by means of a mounting bracket. Furthermore, in some embodiments the first spring may be directly mounted to the second spring without any intermediate member whatsoever. For example, one end of the first spring may carry the optical element (such as a mirror) while the other is secured directly to one end of a second spring. The other end of the second spring is then securely mounted to a stationary frame, or other stationary component within the scanner housing.

According to a further aspect of the present invention there is provided a scanning arrangement for use in a scanner for reading indicia having parts of differing light reflectivity, the arrangement comprising:

a) an optical element;

b) a first spring mounted to the optical element for oscillation in a first direction, the first spring having a relatively high modulus of elasticity and the optical element having a relatively low inertia when oscillating by elastic movement of the first spring; and c) a second spring mounting the optical element and the first spring for oscillation in a second direction, the second spring having a relatively low modulus of elasticity and the optical element and first spring taken together having a relatively high inertia when oscillating by elastic movement of the second spring.

The invention may be carried into practice in a number of ways, and one specific embodiment will now be described, by way of example, with reference to the accompanying drawings. The novel features which are considered as characteristic of the invention are set forth in particular in the appended claims. The preferred features of the invention, however, both as to its construction and its method of operation, together with additional objects and advantages thereof, will best be understood from the following description, when read in conjunction with the drawings.

BRIEF DESCRIPTION OF THE DRAWINGS

FIG. 1 is a front perspective view of a hand-held head employed in a scanner;

DETAILED DESCRIPTION OF THE PREFERRED EMBODIMENT

Figure 2:
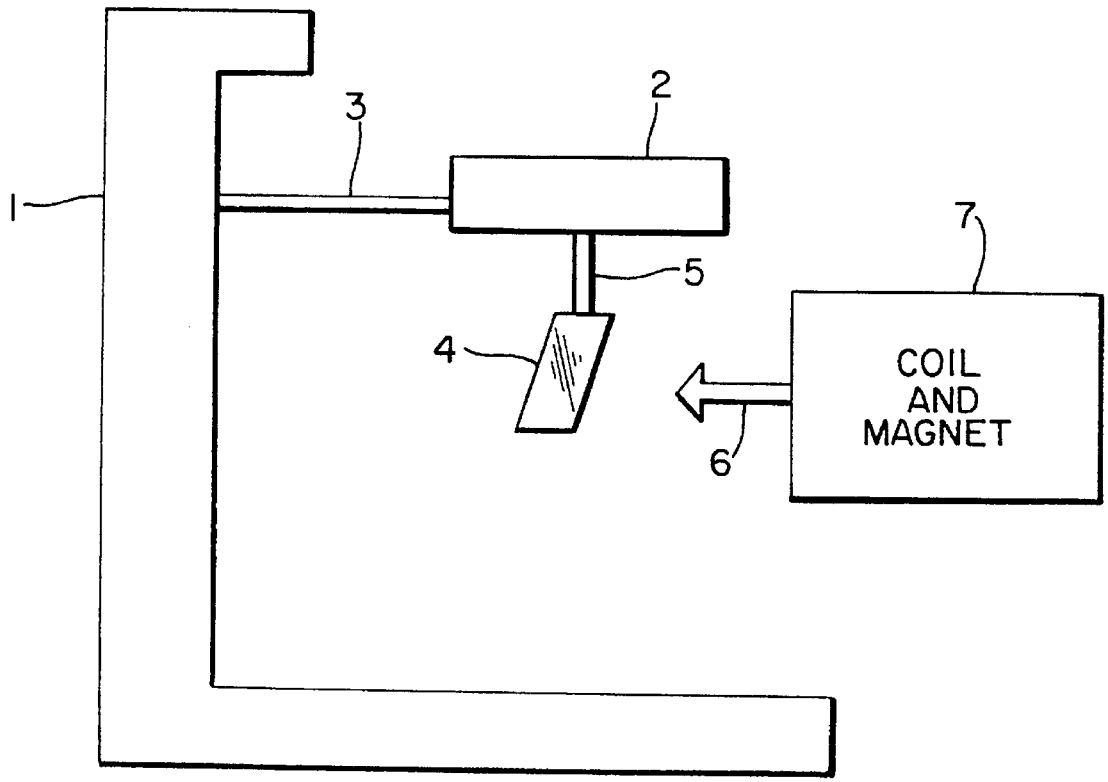
FIG. 2 is a schematic view of an arrangement embodying the present invention.

Referring now to the drawings, as shown in FIG. 1, reference numeral 10 generally identifies a hand-held, gun-shaped scanner head having a barrel 12 and a handle 14. The head need not be gun-shaped as any suitable configuration may be used, such as box-like. A manually-operable trigger 16 is situated below the barrel 12 on an upper, forward-facing part of the handle 14. As known from the above-identified patents and applications incorporated by reference herein, a light source component, typically, but not necessarily, a laser, is mounted inside the head 10. The light source emits a light beam along a transmission path which extends outwardly through a window 18 that faces indicia, e.g. bar code symbols, to be read. Also mounted within the head is a photodetector component, e.g. a photodiode, having a field of view, and operative for collecting reflected light returning through the window 18 along a return path from the symbol.

A scanner component is mounted within the head 10, and is operative for scanning the symbol and/or the field of view of the photodetector. The scanner component includes at least one light reflector positioned in the transmission path and/or the return path. The reflector is driven by an electrically-operated drive to oscillate in alternate circumferential directions, preferably at the resonant frequency of the scanner component.

The photodetector generates an electrical analog signal indicative of the variable intensity of the reflected light. This analog signal is converted into a digital signal by an analog-to-digital converter circuit. This digital signal is conducted, according to one embodiment, along an electrical cable 20 to a decode module 22 located exteriorly of the head 10. The decode module 22 decodes the digital signal into data descriptive of the symbol. An external host device 24, usually a computer, serves mainly as a data storage in which the data generated by the decode module 22 is stored for subsequent processing.

In operation, each time a user wishes to have a symbol read, the user aims the head at the symbol and pulls the trigger 16 to initiate reading of the symbol. The trigger 16 is an electrical switch that actuates the drive means. The symbol is repetitively scanned a plurality of times per second, e.g. 40 times per second. As soon as the symbol has been successfully decoded and read, the scanning action is automatically terminated, thereby enabling the scanner to be directed to the next symbol to be read in its respective turn.

In addition, the head need not be a portable hand-held type as fixedly mounted heads are also contemplated in this invention. Furthermore, the heads may have manually operated triggers or may be continuously operated by direct connection to an electrical source.

The oscillations need only last a second or so, since the multiple oscillations, rather than time, increase the probability of getting a successful decode for a symbol, even a poorly printed one. The resonating reflector has a predetermined, predictable, known, generally uniform, angular speed for increased system reliability.

Turning now to FIG. 2, there is shown, in purely schematic form, an embodiment of the present invention. As will immediately be evident from the drawing, this is not intended to be a practical embodiment, but rather to provide a basis for explaining the general concepts that make up the present invention.

As shown in FIG. 2, an optical element such as a mirror 4 is mounted for oscillation to a mounting bracket 2 by first spring means such as a leaf spring 5. The mounting bracket 2 is in turn mounted for oscillation on a stationary frame 1 by second spring means such as a second leaf spring 3. The leaf spring 5 allows the mirror 4 to oscillate in a first (x) direction with respect to the mounting bracket 2, whereas the second leaf spring 3 is arranged to allow the entire unit comprising the mirror, the first leaf spring and the mounting bracket to oscillate in a second (y) direction. A driver 7 provides an oscillatory force 6 which causes flexing of both of the leaf springs, and hence scanning in both the x and y directions.

Scanning in the x direction is relatively fast, by virtue of the first leaf spring 5 having a relatively high modulus of elasticity, and by virtue of the mass of the mirror 4 being relatively low. Oscillation in the y direction, on the other hand, is relatively slow by virtue of the second leaf spring 3 having a relatively low modulus of elasticity, and by virtue of the combined masses of the bracket, first leaf spring and mirror being relatively high. To put it another way, there is matching between the modulus of elasticity of the leaf spring and the mass of the corresponding oscillating parts: the modulus is high when the mass of the oscillating parts is low, and vice versa. In a practical example, the leaf spring 5 may be made of beryllium copper, with a modulus of elasticity of about 19 million psi; the second leaf spring 3 may be of Mylar, having a relatively low modulus of elasticity of about 750,000 psi.

The driving force 6 may comprise the superposition of two separate oscillatory signals, a high frequency signal to stimulate oscillation in the x direction, and a low frequency signal to stimulate oscillation in the y direction.

From the above description, it will accordingly be appreciated that the frequency of oscillation in the y direction depends upon the modulus of elasticity of the spring 3, and on the total mass that has to be moved in the y direction: in this case, the mass of the bracket 2, the first spring 5 and the mirror 4. The frequency of oscillation in the x direction depends upon the modulus of elasticity of the first spring 5, and on the mass that has to be moved in the x direction: the mass of the mirror 4 alone.

To be yet more specific, it will be appreciated by the skilled artisan that the x and y scanning frequencies depend strictly speaking not upon the respective masses but on the respective inertias. Since there is a certain element of rotation, as well as translation, when the springs flex, the actual dynamic characteristics of the arrangement may be slightly more complicated than has been indicated above. However, the general principles still apply, and it is easily within the skill of an artisan in the field to select the masses involved and the moduli of elasticity to achieve the required frequencies of oscillation in the x and y directions.

Figure 3:
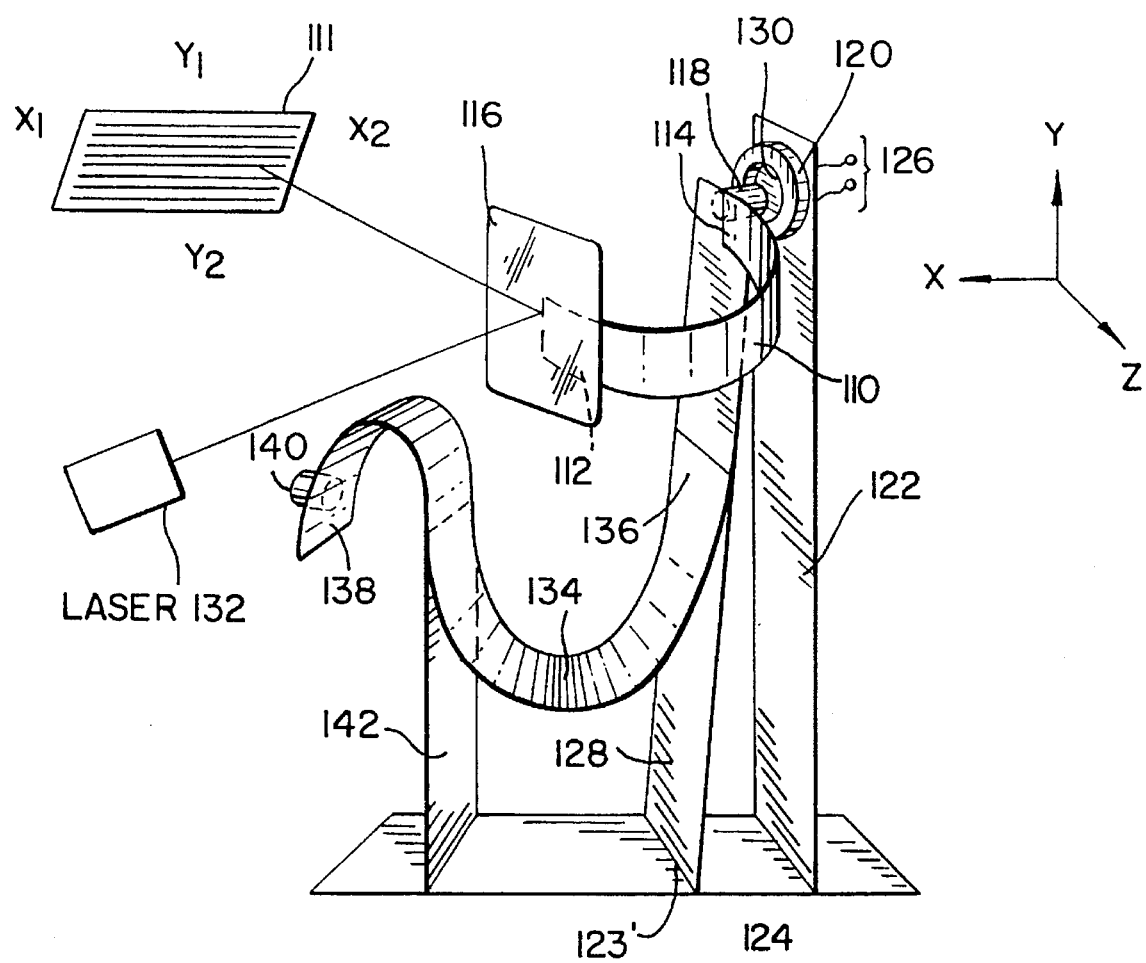
FIG. 3 is a perspective view of an embodiment of a scanning arrangement according to the present invention.

A specific embodiment of a two-axis scan pattern arrangement is shown in FIG. 3, in which a U-shaped spring 110 has a pair of arms 112, 114. A scanning component, e.g. a light reflector or mirror 116 is fixedly mounted on arm 112 and a permanent magnet 118 is mounted on arm 114. An electromagnetic coil 120 is fixedly mounted to an upright support 122 that is secured to a base 124. Electrical input leads 126 supply the energizing signal to the coil 120. The arm 114 and magnet 118 are secured to a generally planar spring means 128 that is mounted to the base 124. The planar spring 128 may be made of any suitable flexible material, such as, a leaf spring, a flexible metal foil, a flat bar or a Bendix flex-pivot-type spring. The mirror mass, which is equal to the magnet mass, can be in certain cases much higher than the equivalent mass of the U-shaped spring.

In certain applications, it is desirable to scan indicia with a raster-type scan pattern. In a raster-type scan pattern, a series of substantially horizontal and substantially parallel scan lines are produced from an upper horizontal scan line, proceeding downward with a multiplicity of intermediate horizontal scan lines, to a lower horizontal scan line in order to uniformly cover the desired scan area. In order to obtain a raster-type scan pattern, the U-shaped spring 110 and the planar spring 128 are arranged to vibrate in planes orthogonal to each other. As shown in FIG. 3, the arms of the U-shaped spring will vibrate in the x-z plane and the planar spring 128 will vibrate in the x-y plane. By this arrangement of the holder means, the component 116 is mounted for angular oscillating movement, in first and second alternate circumferential directions, between first and second pairs of scan end positions. In addition, due to their respective shapes and positioning, the U-shaped spring 110 will vibrate at a high range of frequencies, typically about 200–800 Hz, while the planar spring 128 will vibrate at a low range of frequencies, typically about 5–100 Hz. The amplitude of vibration necessary to scan the symbol will depend on the size of the symbol and will typically be at least 10°–30° optical.

A raster-type scan pattern is automatically obtained by driving the coil 120 with a signal that is a superposition of two driving signals, one being within the high frequency range and the other being within the low frequency range. For example a 500 Hz square wave signal may be utilized to oscillate component 116 in the x direction and a 10 Hz sine wave signal may be utilized to oscillate to component 116 in the y direction. The combination of the fast oscillations of the component in the x direction and the slow oscillations of the component in the y direction results in a raster-type scan pattern over the indicia. Preferably, the high frequency signal is frequency tuned to the resonant frequency of the U-shaped spring 110. Typically, the planar spring 128 will be driven below its resonant frequency.

In this arrangement, whenever the superimposed AC driving signal is supplied to coil 120, the coil cyclically draws the magnet 118 into a passage 130 and propels the magnet 118 out of the passage 130. The high frequency component of the driving signal causes the U-shaped spring to vibrate, preferably at the resonant frequency, causing the component 116 to be angularly oscillated between scan end positions X1, X2. The low frequency component of the driving signal causes the planar spring 128 to angularly vibrate towards and away from the support 122 about pivot line 123'. During this low frequency vibration, the spring 128 and the spring 110 move as a unit. The vibration of planar spring 128 imparts an angular oscillating movement to the component 116 between scan end positions Y1, Y2. When light emitted from laser 132 is directed at reflector 116 while the U-shaped spring 110 and the planar spring 128 are vibrating simultaneously at the high and low frequencies, respectively, a series of substantially horizontal scan lines 111 in the x direction are produced that are displaced in the y direction thereby forming a raster-type scan pattern.

The arrangement of FIG. 3 is advantageously a very simple construction which utilizes only one driver (one coil and one magnet) for oscillating movement in two directions to form a raster-type scan pattern. There are no shafts or bearings but only flexible metals are used which result in much longer life.

In certain applications, it is desirable to increase the angular amplitude by the scan line produced by the holder. Such an increase in angular amplitude may be attained by constructing the U-shaped spring 110 with asymmetrically dimensioned arms. In this embodiment, arm 112 is shorter than arm 114 by ratio of at least 2:1. An asymmetrically dimensioned U-shaped spring will result in a longer x direction scan line in the raster-type pattern.

Figure 4:
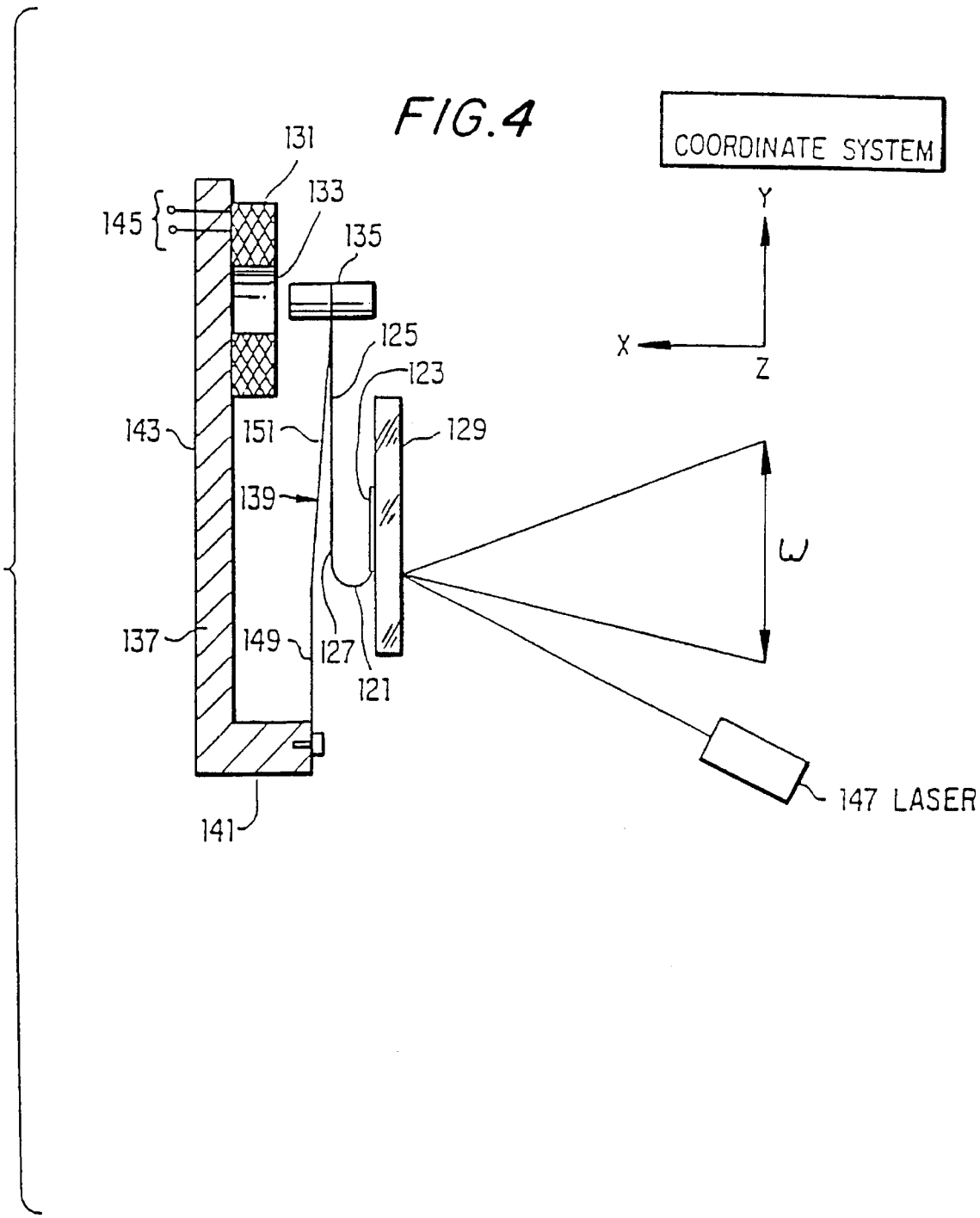
FIG. 4 is a cross-sectional view of a further embodiment of a scanning arrangement according to the present invention.

An example of an asymmetrically dimensioned U-shaped spring is shown in FIG. 4 in which the tuning fork 121 is constructed having a small dimensioned arm 123 and a large dimensioned arm 125 which results in the nodal point 127 of the spring being positioned on arm 125 rather than at the bottom of the U as with a symmetrically dimensioned spring. As shown in FIG. 4, the component 129 is mounted to arm 123 and the actuator comprises an electromagnetic coil 131 having a passage 133 through which magnet 135 passes with clearance. The U-shaped spring 121 is secured to a support 137 by a planar spring 139. The spring 139 is secured to base section 141 and the coil 131 is mounted to wall section 143. Leads 145 are provided to apply the driving signal to the coil 131 to effect angular movement of the component 129. The asymmetrically dimensioned U-shaped spring 121 provides an increased angular amplitude of the scan resulting from light directed from a laser 147 and reflected from component 129.

Figure 5:
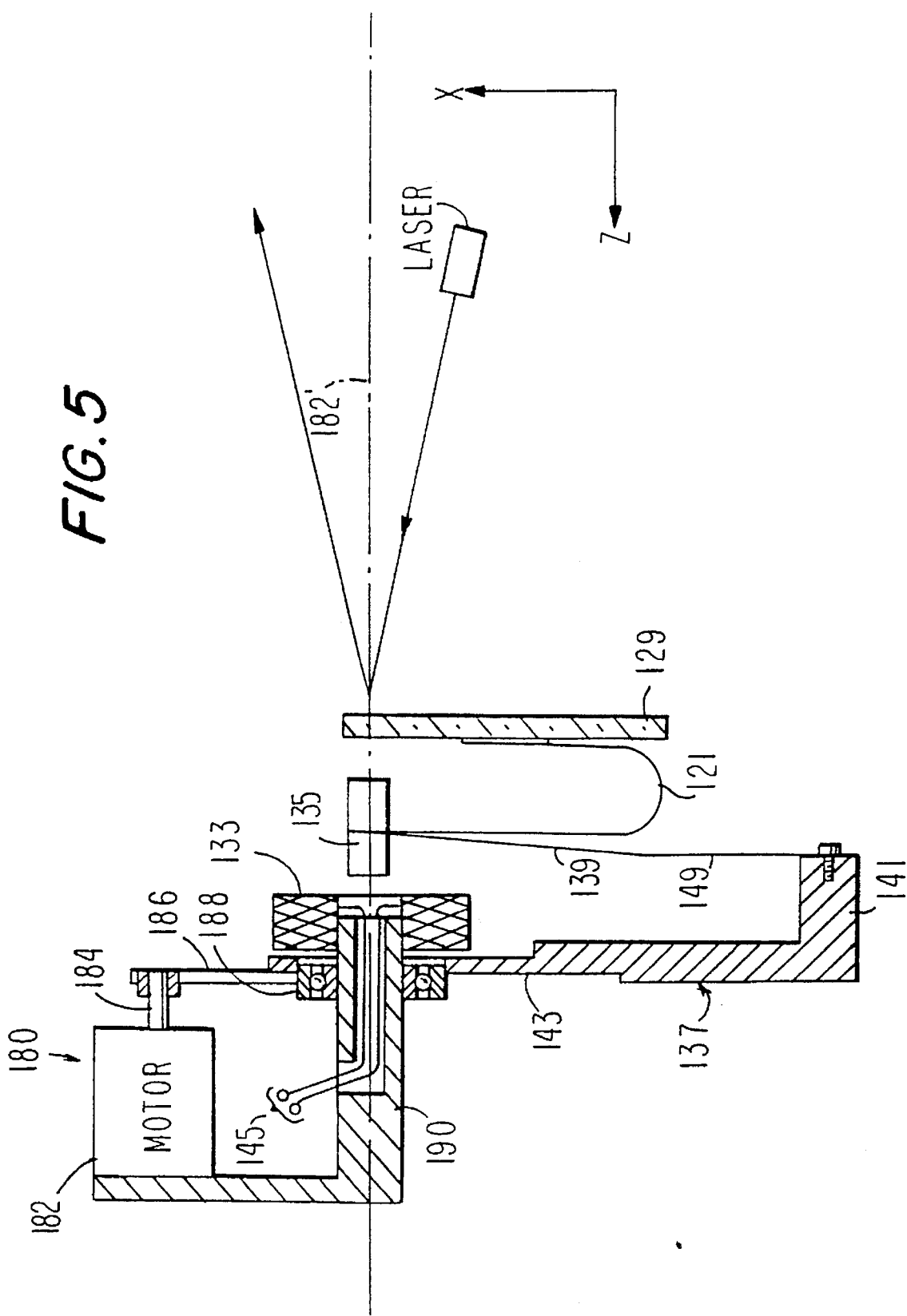
FIG. 5 is a cross-sectional view of yet another embodiment of a scanning arrangement according to the present invention.

In addition to increasing the angular amplitude, which can be as much as a 100% increase over a symmetrically dimensioned spring, the asymmetrically dimensioned U-shaped spring provides a higher durability against metal fatigue and cracking since the nodal point is not at a curved portion of the spring. Also shown in FIG. 5 is a section 149 of spring 139 that is substantially parallel to wall 143 and section 151 angled away from wall 143 while spring 139 at rest. The angled section 151 results in a further increase in the angular amplitude of scan oscillations (as much as 200% higher when combined with the asymmetric U-shaped spring 121) over a symmetrically dimensioned U-shaped spring. Another benefit is less vibration and stress being transferred to the base section 141 since the U-shaped spring is held only at the magnet end and angular movement of the magnet can be four times lower than that of the scanning component.

With the arrangement of FIG. 4 viewed as an elevation or side view, i.e. with gravitational forces substantially aligned with the y axis, the U-shaped spring 121 and the planar spring 139 are both positioned for vibration in the x-y plane resulting in a single scan line directed along the y axis, i.e. in the y direction. If the U-shaped and planar springs are positioned in orthogonal planes as in FIG. 3, and an appropriate superimposed high and low frequency driving signal is applied to the coil, a raster-type scan pattern will be provided with an increased y direction angular amplitude.

Referring back to FIG. 3, in an alternative embodiment, the y direction scan vibratory means may also include a generally S shaped planar leaf spring 134 having one arm 138 to which is mounted a balance mass 140. An additional generally upright planar spring 142 secures an intermediate portion of the planar spring 134 to the base 124. The S-shaped spring is useful to provide additional support that may be necessary for very large area reflectors.

In certain applications, it may be desirable to scan a symbol with an omnidirectional scan pattern. One technique for obtaining an omnidirectional pattern is to position the arrangement of FIG. 4 such that the U-shaped spring vibrates in both the x-y and the x-z planes. Hence, by viewing FIG. 4 as the top or plan view of the arrangement, i.e. with gravitational forces substantially aligned with the z axis, it can be seen that the material mass of the elements on the right hand side of spring 139 (i.e. spring 121, component 129 and the part of magnet 135 to the right of spring 139) is substantially greater than the mass of the elements on the left hand side of spring 139 (i.e. the part of magnet 135 to the left of spring 139). This difference in mass provides a weight imbalance that results in a torsional bending of the spring 139 that, in conjunction with an appropriate drive force, imparts an angular oscillatory movement of the component 129 in the x-z plane for effecting a z direction scan. It will be understood that although it will normally be preferable for the mass of component 129 and spring 121 to exceed that of the portion of the magnet 135 to the left of spring 139, an omni-directional scan pattern is obtainable so long as an imbalance exists between the mass of the component to the right and the mass of the components to the left of the center of gravity of spring 139. In addition, the movement of the spring 139 towards the coil 131 and away from the coil 131 causes the U-shaped spring 121 to vibrate in the x-y plane which imparts an angular oscillatory movement to the component 129 for effecting a y direction scan.

Upon the application of the superimposed driving signal, preferably comprised of a pair of sine waves having a frequency ratio in the range of 1.05:1 to 5:1, to leads 145, spring 139 torsionally vibrates at the lower frequency to provide z direction scanning of the light beam from laser 147 and the U-shaped spring 121 simultaneously vibrates at the higher frequency to provide y direction scanning of the light beam from laser 147. The simultaneous vibrating of springs 139 and 121 are driven in such a manner that light will be reflected from the component 129 in a Lissajous scan pattern over the indicia. The Lissajous pattern is provided by the path of the light beam being oscillated in the z and y orthogonal directions in simple harmonic motions at a predetermined ratio of frequencies. Thus, an omnidirectional scan pattern is produced. It should be noted that, if desired, spring 139 could be made to torsionally vibrate at a higher frequency and the U-shaped spring 121 could be made to vibrate at a lower frequency.

FIG. 5 shows another technique for producing an omnidirectional scan pattern namely, rotating the entire holder means about an axis. The arrangement shown in FIG. 5 is similar to that of FIG. 4 and like reference numerals are used to identify like parts and a description thereof is not repeated here for the sake of brevity. In order to rotate the entire scanning arrangement, means 180 is provided to rotate the arrangement about an axis 182'. The means 180 shown in FIG. 5 is illustrative only as any means for rotating the scanning arrangement about an axis may be employed to effect an omnidirectional scan pattern. The means 180 includes a motor 182 having a shaft 184 for driving a transmission belt 186. Belt 186 is coupled to a shaft (not shown) connected to the support 137 for rotating the support 137 about ball bearing 188 which is attached to support beam 190. The rotation of a single axis direction scan arrangement will produce an omnidirectional scan patter in the form of a rosette. The rotation of a two-axis scan arrangement will produce various other omnidirectional patterns depending on the type of two-axis arrangement rotated.

It will be understood that each of the elements described above, or any two or more together, may also find a useful application in other types of constructions differing from those described.

While the invention has been illustrated and described as embodied in a particular scanner arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims. What is claimed as new and desired to be protected by letters patent is set forth in the appended claims.

We claim:

1. A scanning arrangement for use in a scanner for reading indicia having parts of differing light reflectivity, the arrangement comprising:

a) an oscillatable scanner element;

b) a mounting bracket, the scanner element being mounted for oscillation to the mounting bracket by a first spring having a relatively high modulus of elasticity, the scanner element having a relatively low inertia when oscillating at a relatively fast rate of oscillation along a first direction by elastic movement of the first spring; and c) a stationry frame, the mounting bracket being mounted for oscillation to the frame by a second spring having a relatively low modulus of elasticity; and the scanner element, mounting bracket and first spring taken together having a relatively high inertia when oscillating at a relatively slow rate of oscillation along a second direction generally orthogonal to said first direction by elastic movement of the second spring.

2. The scanning arrangement as claimed in claim 1, and further comprising a driver for moving the springs, the driver including an electromagnetic coil simultaneously driven at first and second different frequencies to oscillate the scanner element along said first and second directions.

3. The scanning arrangement as claimed in claim 1, wherein the oscillation of the scanner element is resonant.

4. The scanning arrangement as claimed in claim 1, wherein the oscillation of the mounting bracket is resonant.

5. The scanning arrangement as claimed in claim 1, wherein the first spring is a leaf spring.

6. The scanning arrangement as claimed in claim 1, wherein the second spring is a leaf spring.

7. The scanning arrangement as claimed in claim 6, wherein the leaf spring is a flat spring.

8. The scanning arrangement as claimed in claim 1, wherein the scanner element is a mirror.

9. The scanning arrangement as claimed in claim 1, and further comprising a driver for oscillating the scanner element with respect to the mounting bracket at a relatively high frequency, and the mounting bracket with respect to the frame at a relatively low frequency.

10. A scanning arrangement for use in a scanner for reading indicia having parts of differing light reflectivity, the arrangement comprising:

a) an oscillatable scanner element;

b) a first spring mounted to the scanner element for oscillation in a first direction, the first spring having a relatively high modulus of elasticity, and the scanner element having a relatively low inertia when oscillating at a relatively fast rate of oscillation along the first direction by elastic movement of the first spring; and c) a second spring for mounting the scanner element and the first spring for oscillation in a second direction, the second spring having a relatively low modulus of elasticity, and the scanner element and first spring taken together having a relatively high inertia when oscillating at a relatively slow rate of oscillation along the second direction generally orthogonal to said first direction by elastic movement of the second spring.

11. The scanning arrangement as claimed in claim 10, and further comprising a counterweight means for counterbalancing the weight of the scanner element at the second spring.

12. The scanning arrangement as claimed in claim 10 wherein the first spring is mounted to the second spring.

13. The scanning arrangement as claimed in claim 10, wherein the first spring is mounted to an intermediate member, and the intermediate member is mounted to the second spring; and wherein the scanner element, intermediate member and first spring taken together have a relatively high inertia when oscillating by elastic movement of the second spring.

14. The scanning arrangement as claimed in claim 10, and further comprising a driver for oscillating the scanner element with respect to the intermediate member at a relatively high frequency, and the intermediate member with respect to a frame at a relatively low frequency.

15. The scanning arrangement as claimed in claim 10, wherein the first and second springs are leaf springs.

16. The scanning arrangement as claimed in claim 15, wherein the leaf spring is U-shaped.

\* \* \* \* \*